United States Patent [19]
Nir et al.

[11] Patent Number: 4,588,778
[45] Date of Patent: May 13, 1986

[54] TOUGHENING REINFORCED EPOXY COMPOSITES WITH BROMINATED POLYMERIC ADDITIVES

[75] Inventors: Zohar Nir, Beer Sheva, Israel; William J. Gilwee, Jr., Los Altos, Calif.

[73] Assignee: The United States of America as represented by the Administrator of the National Aeronautics and Space Administration, Washington, D.C.

[21] Appl. No.: 765,980

[22] Filed: Aug. 15, 1985

Related U.S. Application Data

[62] Division of Ser. No. 493,865, May 12, 1983, Pat. No. 4,550,129.

[51] Int. Cl.$^4$ .................. C08L 63/04; C08L 63/10
[52] U.S. Cl. ................................. 525/115; 525/119; 525/122; 525/108; 523/434; 523/438; 523/445; 523/461; 523/468
[58] Field of Search .................. 525/115, 119, 122

[56] References Cited

U.S. PATENT DOCUMENTS 3,947,522  3/1976  Shelley, Jr. et al. ............... 525/115

Primary Examiner—John C. Bleutge
Assistant Examiner—Robert E. L. Sellers, II
Attorney, Agent, or Firm—Darrell G. Brekke; John R. Manning; Robert D. Marchant

[57] ABSTRACT

Cured polyfunctional epoxy resins including tris(hydroxyphenyl)methane triglycidyl ether are toughened by addition of polybrominated polymeric additives having an EE below 1500 to the pre-cure composition. Carboxy-terminated butadiene-acrylonitrile rubber is optionally present in the pre-cure mixture as such or as a pre-formed copolymer with other reactants. Reinforced composites, particularly carbon-reinforced composites, of these resins are disclosed and shown to have improved toughness.

7 Claims, 7 Drawing Figures

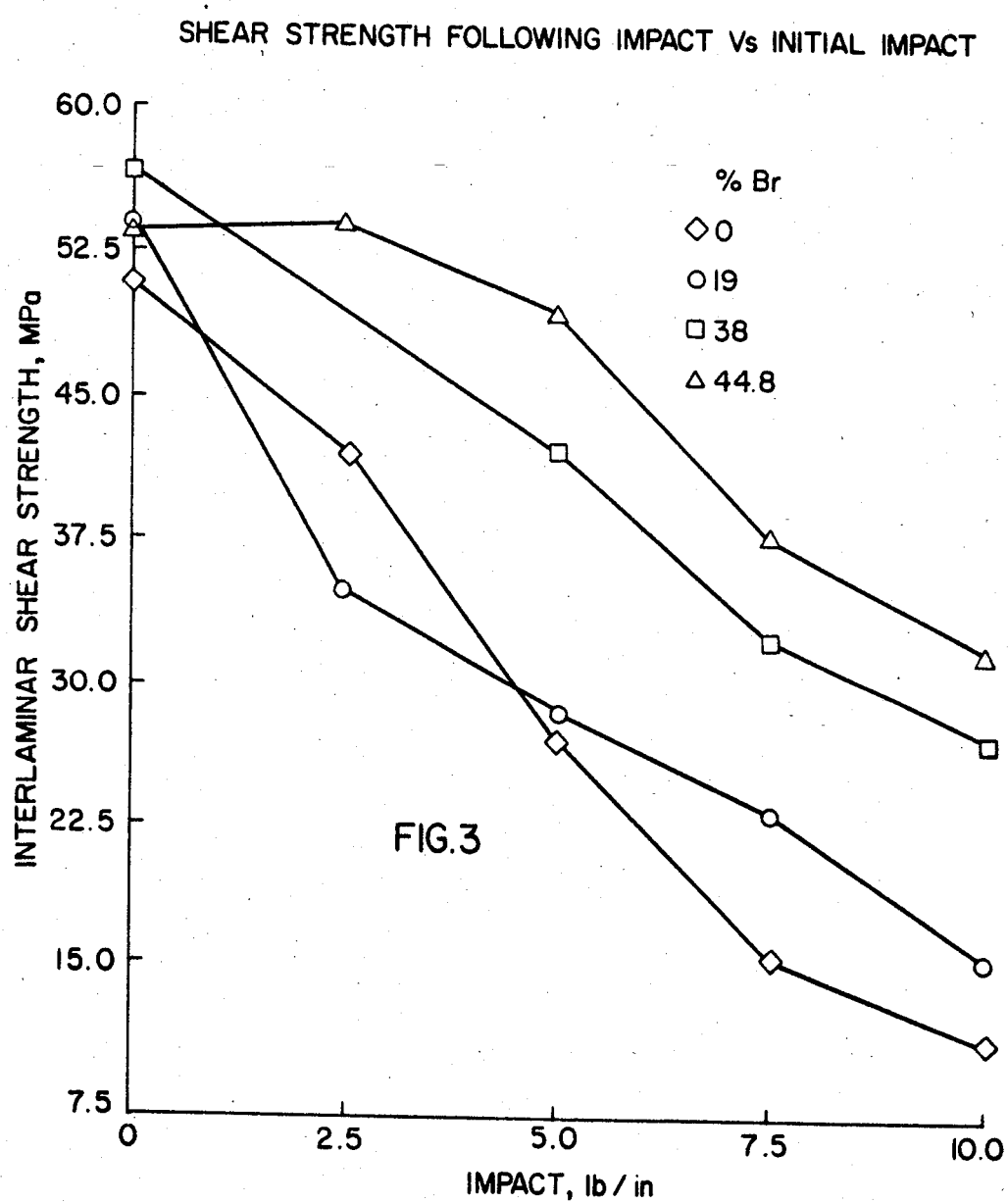

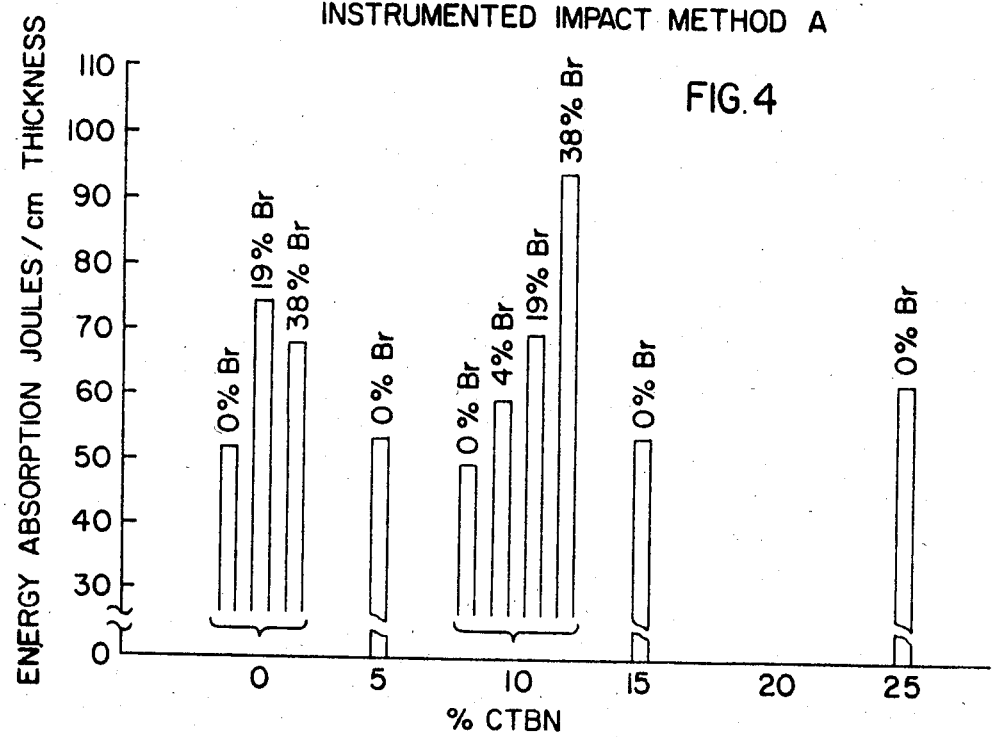
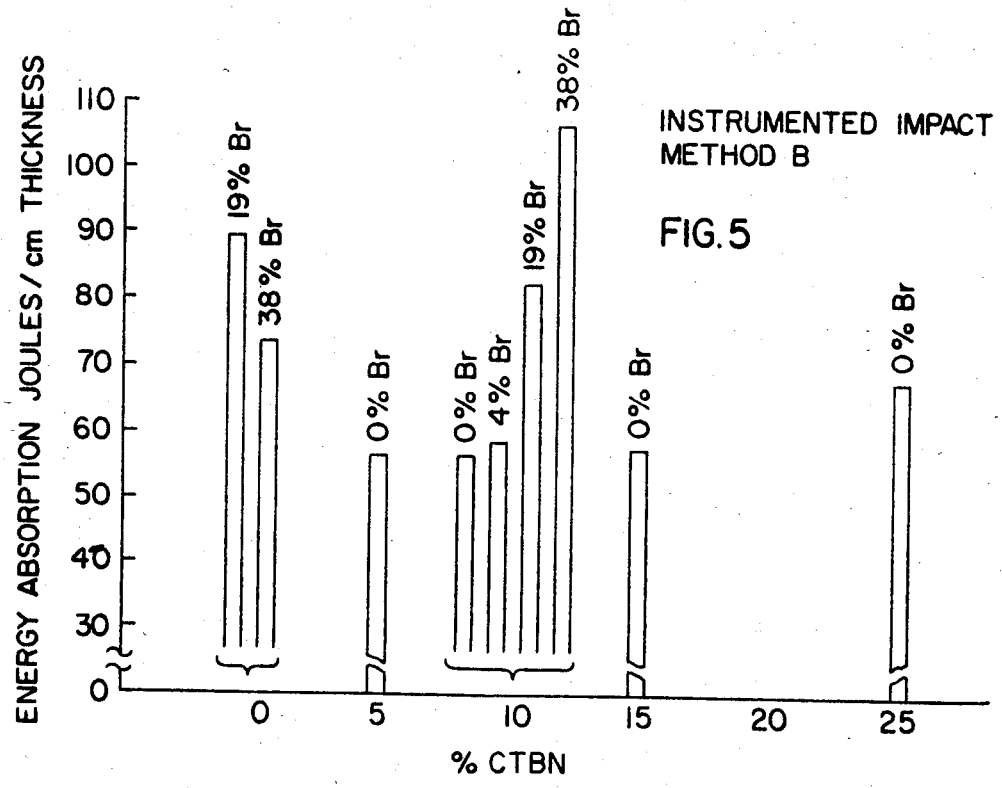

TOUGHENING REINFORCED EPOXY COMPOSITES WITH BROMINATED POLYMERIC ADDITIVES

ORIGIN OF THE INVENTION

The invention described herein was made in the performance of work under a NASA contract and is subject to the provisions of Section 305 of the National Aeronautics and Space Act of 1958, Public Law 85-568 (72 Stat 435; 42 U.S.C. 2457).

This is a division of application Ser. No. 493,865, filed May 12, 1983, now U.S. Pat. No. 4,550,129.

TECHNICAL FIELD

This invention is in the field of reinforced epoxy composites. More particularly, it concerns toughened reinforced epoxy composites.

PRIOR ART

Fiber-reinforced epoxy composites are used in the aircraft and aerospace industries as light-weight structural materials. Several representative patents concerning fiber-reinforced epoxy composites include U.S. Pat. No. 3,203,849 which shows a fiberglass-graphite-fiber-in-epoxy composite; and U.S. Pat. No. 3,367,990 which shows glass-reinforced-epoxy laminates.

A fundamental drawback of these reinforced epoxy constructions is their brittleness. Brittleness means that the composites, though strong, are not tough which limits their applications to secondary structures in aerospace settings. One approach to improve toughness is to add a rubber toughener. B. F. Goodrich has developed carboxy-terminated reactive liquid polymers (CT-RLP) which it markets as HYCAR ® RLP. Goodrich suggests adding from 3% to 100% or more (basis resin) of the CT-RLP to the resin. At high levels the material takes on "rubber like" properties which points up a problem with this approach. As toughness is achieved, there is a marked sacrificing of mechanical properties. In addition, adding the RLP materials deteriorates the environmental stability of the finished composite—it takes on a substantially increased water pick-up. Moreover, the RLP materials are flammable aliphatic polymers. When a flame-retarded product is desired, as in the case in high performance aerospace applications, one prefers to not add flammable components.

Several brominated epoxies are known. Their use as flame retardency additives for plastics s also known. See for example *Chem Abstracts*, 87:24194p, February, 1977; *Chem Abstracts*, 85:161267n, August, 1976; and *Chem Abstracts*, 90:39683h, September, 1978.

Polyfunctional epoxy resins also are known materials and include for example tetraglycidyl 4,4'-diaminodiphenyl methane (TGDDM) and tris-(hydroxyphenyl)methane triglycidyl ether (TEN epoxy resin) which are available commercially.

It is an object of this invention to provide an improved method for toughening epoxy resin composites and thus also to provide the tough composites.

It is a further object to provide a tough epoxy composite that achieves its toughness with minimal compromise of its mechanical properties, its water pick-up properties, its flame retardancy, and its ease of manufacture.

STATEMENT OF THE INVENTION

It has now been found that brominated polymeric additives (BPA's) having an epoxy equivalent weight of less than about 1500 toughen polyfunctional epoxy resins and that a mixture of BPA's with polyfunctional epoxy resins when cured in a reinforced composite have substantially enhanced fracture toughness. In one aspect the present invention concerns the epoxy/BPA pre-cure mixtures. In another aspect it concerns the cured composites. In preferred embodiments, the mixtures and composites may additionally include minor amounts of a pre-reacted copolymer of carboxy-terminated butadiene-acrylonitrile rubber with either the epoxy or the BPA.

The composites of this invention are characterized by excellent toughness, fracture resistance, flame resistance, resistance to attack by the environment of use and low water pick-up. In addition, the compositions are easy to formulate.

BRIEF DESCRIPTION OF THE DRAWINGS

This invention will be further described with reference being made to the accompanying drawings wherein FIG. 3 is a graph showing the increase in shear strength of a reinforced composite which results from practicing the present invention, and FIGS. 4 through 7 are bar graphs showing the increase in impact toughness of reinforced composites which results from practicing the present invention.

DETAILED DESCRIPTION OF THE INVENTION

Figure 1:
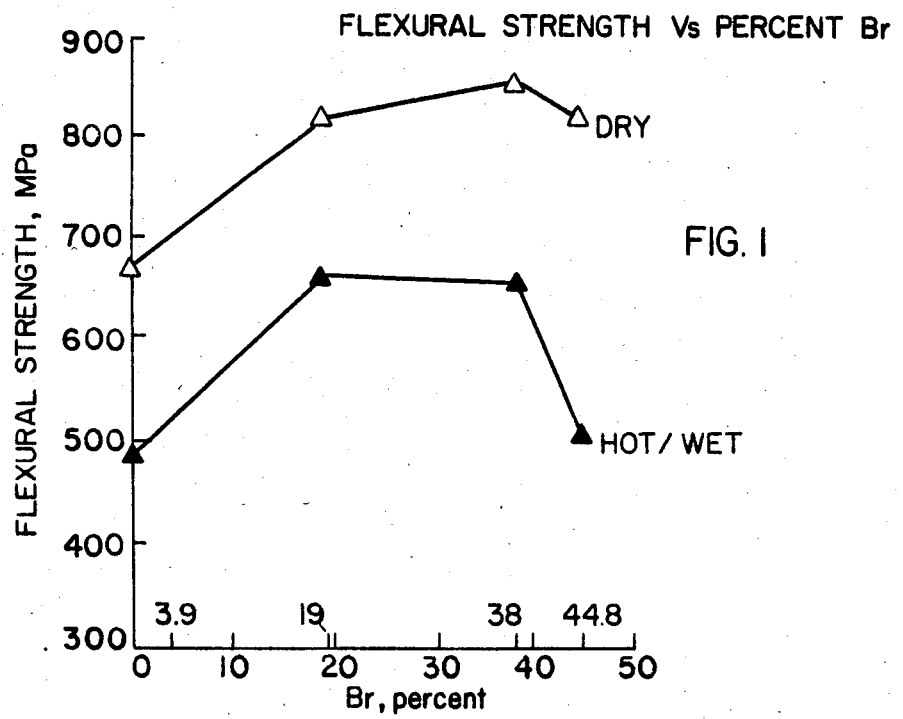
FIG. 1 is a graph illustrating the increased flexural strength of a reinforced composite which results when the present invention is practiced.

This invention involves epoxy-resin compositions which contain polyfunctional epoxy resins and specified equivalent weight brominated polymeric additives "BPA's". In addition they may contain curing agents, minor amounts of carboxy-terminated rubber "CTBN's", pre-formed CTBN-epoxy copolymers, and/or pre-formed CTBN-BPA copolymers as well as other additives known in the art. Each of these materials will be discussed separately. The overall resin compositions and the reinforced composites and their preparation based on these compositions will then be discussed.

Polyfunctional Epoxy Resin

The polyfunctional epoxy resin employed herein is an epoxy resin characterized as containing more than two epoxide (oxirane) groups per molecule in its pre-cured monomeric form. As a general class, these materials are characterized as polyglycidyl aromatic resins. These materials include materials having the structural formula

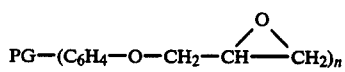

wherein PG is an alkyl or alkaryl or aryl radical optionally itself substituted with an oxirane group-containing radical, and n is a number greater than 2, preferably, on average, from about 3 to about 5; and materials having the structure

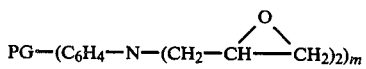

wherein PG is as previously defined and m is a number greater than 1, preferably on average from about 1.5 to about 3. In these materials, PG preferably is a 1 to 3 carbon alkyl, an alkyl-aryl-alkyl wherein the alkyls are from 1 to 3 carbons and the aryl is a 6 carbon aryl, i.e. a $-C_aH_{2a}-C_6H_4-C_aH_{2a}-$ unit wherein a is 1 to 3, or a 2 or 3 unit oligomer of such an alkyl-aryl-alkyl unit, e.g. a $-C_aH_{2a}-C_6H_4-C_aH_{2a}-C_6H_4-C_aH_{2a}-$ unit. As previously noted, in any of these cases, one or more hydrogens on the aryl segments of a PG unit can be replaced with an oxirane-group-containing radical, for example a $$-O-CH_2-\overset{O}{\overset{\diagup\diagdown}{CH-\!\!-\!\!-\!\!CH_2}} \text{ radical.}$$

Preferred epoxy resins contain 3 or 4 glycidyl epoxy groups in their monomeric form and include, for example, tris-(hydroxyphenyl)methane triglycidyl ether

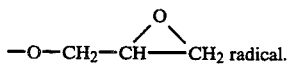

(described in U.S. Pat. No. 4,394,496 and West German Pat. No. 2,240,197 incorporated herein by reference and distributed by Dow Chemical Company as XD 7342.00L) tetraglycidyl-4,4'-diaminodiphenylmethane

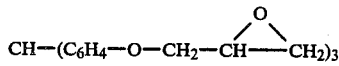

(marketed by CIBA-Giegy as MY-720). The first material is also referred to as "TEN-Tris Epoxy Novolac" or "TEN resin". The second is also referred to as "TGDDM resin". The TGDDM resin is widely available commercially under tradenames including MY-720, Araldite MY-720, Hi-Epoxy YH 343, Sumiepoxy ELM-434, Carboform, and Fiberite 976. These two exemplified materials and mixtures thereof are more preferred with the TEN resin being the most preferred polyfunctional epoxy resin.

Brominated Polymer Additives

The brominated polymeric additives (BPA's) are brominated diglycidyl polymers generally containing from a few % to about 55% by weight of bromine and having an epoxy equivalent weight of less than 1500. These materials have the structure

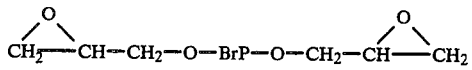

wherein BrP is a polybromoaryl radical such as tri- or tetrabromophenyl or a polybromoalkaryl oligomer such as of the structure

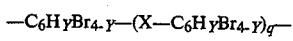

wherein Y is a number greater than 1 and up to 4, preferably 3 or 4; X is a 1 to 5 carbon, preferably 1 to 3 carbon, branched or linear alkyl; and q is a number from 0 to about 8 such that the desired equivalency is achieved. Preferred BPA's have a bromine content of from about 49% to about 51% by weight and an epoxy equivalent weight of from about 250 to about 1000. Most preferred materials have a tetrabromo-bis phenol A structure for BrP. Such materials are manufactured in a variety of epoxy equivalent weights by Makhteshim Chemical Works, Israel and are available from that source as F2200, a 50% bromine material having an epoxy equivalency of 330; and F2001P, a 50% bromine material having an epoxy equivalency of 545. A third material, sold as F2300, a 50% bromine material having an epoxy equivalency of 1800, does not substantially strengthen the composites and in fact in some tests hurts their properties.

Curing Agents

A curing agent, also known as a hardener, is present in the resin. It is believed that any of the known epoxy curing agents can be employed as may mixtures of two or more agents. These include polyanhydrides, polyamines and polyamides. Such materials are described in Chapters 3-5 of the Text *Epoxy Resins-Their Applications and Technology*, by Lee and Neville, McGraw-Hill Book Co., Inc. which description is incorporated by reference.

Preferred curing agents are the simple polyamine and polyamide curing agents, such as nadic methyl anhydride, phthalic anhydride, tetra and hexa hydrophthalic anhydride, maleic anhydride, trimellitic anhydride, dodecenyl succinic anhydride, diethylamino propyl amino, meta phenylene diamine, diethylene triamine, $BF_3$-amine complex, diamino diphenyl sulfone ($SO_2$-$(C_6H_4$-$NH_2)_2$), metaphenylene diamine, methylene dianiline, dicyandiamide and similar guanidines, the like. A particularly preferred curing agent is diamino diphenyl sulfone.

In this system the curing agent functions as a coreactant with the epoxy and thus is present in about equivalent molar reacting amounts with the polyfunctional epoxy. The curing agent is thus present in amounts larger than "catalytic" amounts. "Effective curing amounts" for the curing agent range from about 0.65 to about 1.20 equivalents of curing agent per equivalent of epoxy groups. Preferably one employs from about 0.70 to about 1.00 equivalents of curing agent per equivalent of epoxy and especially from about 0.75 to 0.90 equivalents of curing agent per equivalent of epoxy.

Carbox-terminated Butadiene-acrylonitrile (CTBN) Rubber

CTBN rubber may be present in small amounts in the resin. CTBN rubber is a material having the simplified structure

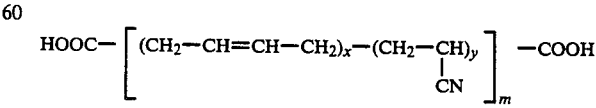

wherein x is a number from 0.65 to 0.9 and y is a number from 0.1 to 0.35 such that the sum of x and y equals 1. m is a number having a value of from 50 to 100 such that the copolymer has an average molecular weight of from about 2500 to 5000. Preferred CTBN rubbers have values for x of from 0.70 to 0.85, y of from 0.15 to 0.30 and m of from 60 to 90 such that the molecular weight is from 3000 to 4500 daltons. Most preferably, x has a value of 0.72 to 0.83 and y has a value of 0.17 to 0.28. CTBN rubber is sold by B. F. Goodrich under the trademark HYCAR. Of these, HYCAR 1300X13 material is the most preferred. It has a molecular weight of 3500 daltons and an x:y ratio of about 63:27.

The CTBN rubber, is present, is present in small amounts relative to the entire resin mixture—for example in amounts in the range of from 0% to 25% by weight and preferably 5 to 12% by weight.

If present, CTBN rubber is preferably pre-reacted to form a copolymer with either of the two primary components—the polyepoxide or the bromine-containing polymeric additive. The rubber can be easily coupled to the epoxy resin by heating an admixture of the two components to a temperature in the range of 45° C. to 250° C., preferably 100° C. to 175° C., for from 0.25 24 hours, preferably from 0.5 to 12 hours in the presence of a carboxyl-epoxide reaction catalyst such as a trialkyl or triaryl phosphine. The time and temperature required will depend inversely on each other. Generally, the reaction is continued until the carboxyl groups of the rubber are essentially completely (e.g., 95+% or preferably 99+%) consumed. Progress of this reaction is easily monitored by titration of carboxyl groups with 0.1N KOH/EtOH, for example. The amount of the reactants is usually controlled to provide at least 2 molecules of epoxy monomer for each molecule of dicarboxylic acid-terminated rubber, so that an "epoxy-rubber-epoxy" block copolymer is formed.

Likewise, a pre-reacted BPA-CTBN-BPA copolymer can be prepared and employed as a source of CTBN units. These pre-reacted materials can be formed using the catalysts, temperatures and other conditions and test procedures set forth for the epoxy-rubber-epoxy material preparation.

In addition to employing either of the "pre-reaction" sequences, one can add additional amounts of unreacted CTBN feedstock as required to achieve a desired product composition.

Other Components

The resin compositions of this invention may contain other components. For example, they can contain dyes and pigments. They can also contain silica gel which is advantageously added to convert the semi-solid "sticky" epoxy resin or the overall composition itself into a free-flowing powder and make it easier to handle. Such a free-flowing powder can be formed, for example, by milling the epoxy resin and 1 to 10% w (basis resin) preferably 2 to 8%, of the silica gel at low temperature, such as −50° C. to +10° C., especially about −15° C. to about 0° C., for a few hours, e.g. 1 to 6 hours. This free-flowing powder form of the resin does not deteriorate the properties of the finished composition within observed experimental error.

Preferred Resin Compositions

Table I is a listing of representative generally preferred generic resin compositions.

Table II is a listing of representative more preferred resin compositions.

TABLE I

Generally Preferred Resin Composition*

| Composition Number | Polyfunctional Epoxy "PE" | Brominated Polymeric Additive "BPA" | "CTBN" | CTBN/PE Copolymer | CTBN/BPA Copolymer | Curing Agent |
|---|---|---|---|---|---|---|
| 1. | 10 | 6–12 | — | — | — | 0.5–10 |
| 2. | 10 | 4–12 | 0–3 | — | — | 0.5–10 |
| 3. | 10 | 4–14 | | 0–6 | | 0.5–10 |
| 4. | 10 | 1–10 | | | 0–6 | 0.5–10 |

*all amounts are parts by weight

TABLE II

More Preferred Resin Composition

| Composition Number | Polyfunctional Epoxy, Number and Amount, parts | Brominated Polymeric Additive, Number & Amt., Parts | CTBN, Parts | CTBN Copolymer Number and Amount, Parts | Curing Agent Number and Amount, Parts |
|---|---|---|---|---|---|
| 101 | 1, 10 | 1, 4 to 8 | 0 to 2 | 1 or 2, 0 to 4 | 1 or 2, 1 to 10 |
| 102 | 1, 10 | 1, 5 to 7 | 0 to 2 | 1 or 2, 0 to 4 | 1 or 2, 1 to 10 |
| 1010 | 1, 10 | 1, 6 | 0 to 2 | 1 or 2, 0 to 4 | 1 or 2, 1 to 10 |
| 104 | 1, 10 | 2, 4 to 8 | 0 to 2 | 1 or 2, 0 to 4 | 1 or 2, 1 to 10 |
| 105 | 1, 10 | 2, 5 to 7 | 0 to 2 | 1 or 2, 0 to 4 | 1 or 2, 1 to 10 |
| 106 | 1, 10 | 2, 6 | 0 to 2 | 1 or 2, 0 to 4 | 1 or 2, 1 to 10 |
| 107 | 2, 10 | 1, 4 to 8 | 0 to 2 | 1 or 2, 0 to 4 | 1 or 2, 1 to 10 |
| 108 | 2, 10 | 1,5 to 7 | 0 to 2 | 1 or 2, 0 to 4 | 1 or 2, 1 to 10 |
| 109 | 2, 10 | 1, 6 | 0 to 2 | 1 or 2, 0 to 4 | 1 or 2, 1 to 10 |
| 110 | 2, 10 | 2, 4 to 8 | 0 to 2 | 1 or 2, 0 to 4 | 1 or 2, 1 to 10 |
| 111 | 2, 10 | 2, 5 to 7 | 0 to 2 | 1 or 2, 0 to 4 | 1 or 2, 1 to 10 |
| 112 | 2, 10 | 2, 6 | 0 to 2 | 1 or 2, 0 to 4 | 1 or 2, 1 to 10 |

Table II Notes
Epoxy: TEN = 1; TGDDM = 2.
Brominated Polymeric Additive: F-2200 = 1; F-2001P = 2.
CTBN Copolymer: 50/50 Epoxy-CTBN = 1; 50/50 BPA-CTBN = 2.
Curing Agent: Conventional Curing Agent = 1; DDS = 2.

Preparation and Use

The resin compositions are simply prepared by physically admixing the various components. (Usually the curing agent is added after the other components are mixed). This can be done in conventional solids-mixing apparatus if the epoxy has been rendered powdered or in a solid-liquid mixing apparatus if the epoxy is a fluid.

The resin preparation can be employed as a "varnish", dissolved in a suitable liquid such as a ketone, or an aprotic organic liquid like DMF, DMAC, DMSO, or THF; or it can be employed as a dry powder or as a hot melt. Lower ketones such as dimethyl ketone (acetone), methyl ethyl ketone and methyl isobutyl ketone are very suitable and preferred as "varnish" solvents. This solution or "varnish" is formed in a mixer, curing agent is added and this varnish is applied to the reinforcement material. In the neat powder application, the resin powder is added to the reinforcement and melted, usually under pressure, to uniformly distribute the resin over the reinforcement.

The resin compositions described above are usually formed into reinforced composites. The reinforcement materials employed can be drawn from the organic and inorganic epoxy reinforcement materials known in the art. These include fibers, either as such or formed into felts, fabrics and the like and made of glass, silicon carbide, graphite, i.e. carbon, boron nitride, and the aramid materials such as the materials marketed as Kevlar ®, Nomex ® and the like. The amount of reinforcement, that is the weight percentage of reinforcement (basis composite) is conventional and can range from about 50% to about 80%.

The reinforced composites of this invention can be in the form of pressure laminates, filament wound bodies, hand laid-up bodies, reinforced castings or in any other form that reinforced epoxy bodies can take.

After the resin composition solution has been applied to the reinforcement it is cured. This is usually done in several stages—the first of which is designed to remove (evaporate) the solvent if present and the latter of which are designed to effect the curing reaction. Exact times and temperatures will generally be selected for the most efficient cure and will generally be in the ranges known in the art for curing epoxy resins. For example, one can employ a temperature of 60°–120° C. for about 5 to 20 minutes to strip off solvent and partially advance the materials, and then use 160° C.–200° C. for an hour to 3 or 4 hours to cure the resins.

This invention will be further described by the following Examples. These are not intended as limitations on the invention's scope.

EXAMPLE I

Four resin compositions were formulated and formed into graphite cloth laminates and tested to determine their physical properties. One of the four compositions contained no brominated polymeric additive "BPA" and thus was not in accord with the invention-being present for comparison. Two contained varying amounts of proper equivalent weight BPA and were in accord with this invention. The fourth contained no polyfunctional resin and was for comparison as well.

The resin was tris-(hydroxyphenyl)methane triglycidyl ether "TEN epoxy resin" of DOW. The brominated polymeric additive was Makhteshim Chemical Works F-2001P. The curing agent was diamino diphenyl sulfone-CIBA-Geigy "Eporal" hardener, "DDS". As graphite cloth reinforcement was used 8-harness satin weave Hexel F3T-584-300-3K.

The TEN epoxy resin was a difficult-to-handle semisolid. It was converted to a free-flowing powder as follows:

1000 g of cold (0°) resin were milled in a ball mill for 3–4 hours with 50 g of Sipernat 13S silica gel from Degussa of West Germany. The milled product was screened to remove lumps.

The dry composition components, less curing agent, were weighed out and dissolved in methyl ethyl ketone using a tumbler for four hours. The curing agent was added and the material was shaken for an additional hour. The graphite cloth was then impregnated with the resin-solvent varnish and staged for 5 minutes at 85° C. and for 8 minutes at 125° C. to remove the solvent and advance the resin.

These pre-pregged cloths were trimmed to size and 9 plies were stacked and cured. Curing was accomplished by increasing the temperature from ambient to 177° C. at 4° C./min, holding at 177° C. for 2 hours under pressure (0.35 MPa (50 psi)), and cooling under pressure to ambient temperature for 600 min; the material was post-cured at 192° C. for 4 hr. An overflow of cured neat resin was squeezed out of the pressed composite laminates.

| Composition | A | B | C | D |
|---|---|---|---|---|
| TEN Epoxy Resin, g | 300 | 160.3 | 39.8 | 0 |
| BPA (F2001P), g | 0 | 139.7 | 260.2 | 300 |
| DDS, g | 96.8 | 67.3 | 42.4 | 34.1 |
| Total, g | 396.8 | 367.6 | 342.4 | 334.1 |
| Br % | 0 | 19* | 38 | 44.8 |
| % BPA, basis BPA + Resin | 0 | 46.6 | 86.7 | 100 |

*19% Bromine is the level needed to achieve Underwriter's Lab U.L. 94 V-O fire retardency rating.

Figure 2:
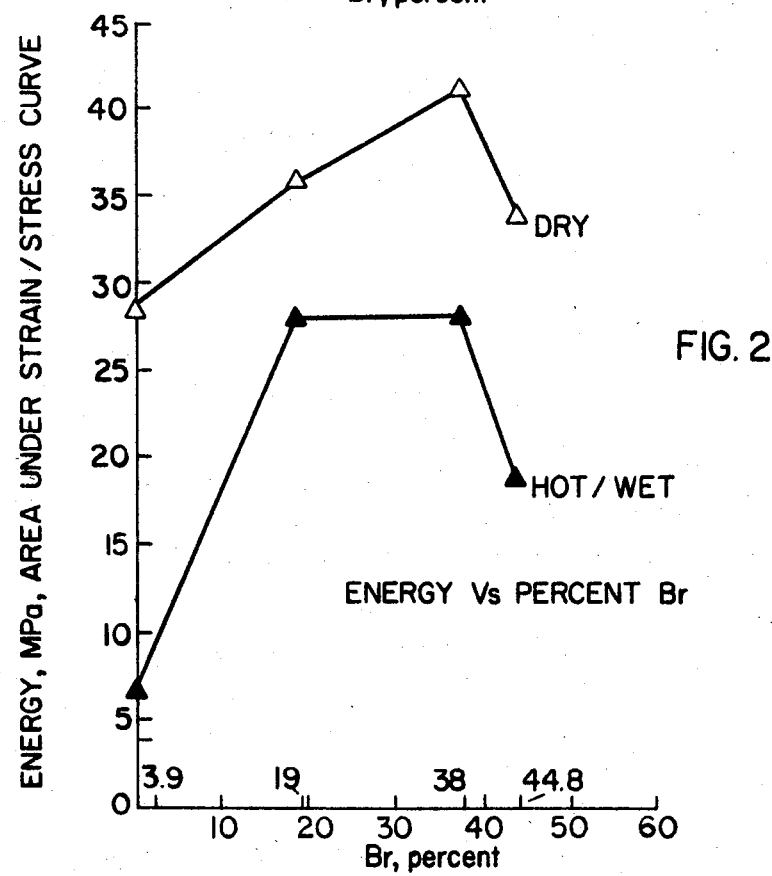
FIG. 2 is a graph showing the increase in energy (i.e. area under the stress-strain curve for a reinforced composite) when the invention is practiced.

The cured laminates were tested for mechanical and chemical properties. The materials' flexural strength was determined on an Instron testing machine using the ASTM D 790-70 method. The energy as determined by the area under the Instron stress/strain curve was determined. These tests were run on the materials dry at room temperature and also under hot/wet conditions 93° C. (200° F.) after 2 hrs boiling in demineralized water. The results of these tests are shown in FIGS. 1 and 2 and demonstrate that adding the BPA to the TEN resin substantially toughens the resin as shown by improvements in the resin's flexural strength and energy value. These results also indicate an optimum addition level in the range of 19% to 38% bromine in both wet and dry tests. The materials were superior to the material without polyfunctional epoxy.

Toughness was also measured by determining these materials' shear strength in the Instron tester using the ASTM D 2344 method following impacting the samples at various impact energies with a hemispherical impactor using a Gardner Impact apparatus. The results of this test was given in FIG. 3 and further demonstrate that the BPA-containing materials retain much higher shear strengths following impact than does the material not containing BPA.

Water absorption values were determined by boiling composite samples for up to 240 hours and periodically weighing them. After 24 hours the no BPA material showed a weight gain of 0.9%. The other three materials showed gains between 0.8 to 1.1%. After 168 hours, the no BPA material showed a gain of 0.9% while the other three materials ranged from 0.8 to 1.1% gain. This showed that the BPA addition did not degrade the materials' resistance to weight gain by water pickup—an important property for aerospace applications.

EXAMPLE II

The preparation and testing of Example I was repeated varying the resin composition to include a preformed copolymer of the brominated polymeric additive with carboxy-terminated butadiene-acrylonitrile rubber. This copolymer was prepared by introducing equal weights of BPA and B. F. Goodrich HYCAR ® 1300X13 RLP carboxy-terminated butadiene-acrylonitrile rubber to a resin kettle and heating to 80° C. At that temperature, mixing was effective. Triphenylphosphine (0.15%) was added under a nitrogen atmosphere. The reaction continued for 2 hr at temperatures of 130° C.–150° C. The reaction advancement was monitored by titration with 0.1N KOH/EtOH to determined the equivalent per hundred grams (EPHR) of the carboxyl group. The reaction continued to 1% of the initial EPHR.

The following resin compositions were prepared:

| Composition | A' | B' | C' | D' |
|---|---|---|---|---|
| TEN epoxy resin, g | 240 | 126.7 | 10.7 | 0 |
| BPA, g | 0 | 101.0 | 222.0 | 240 |
| BPA-CTBN (copolymer), g | 60 | 72.7 | 67.3 | 60 |
| DDS, g | 84.3 | 60.6 | 36.4 | 34.1 |
| Total, g | 384.3 | 361.0 | 336.4 | 334.1 |
| Br, % | 3.9 | 19 | 38 | 40.4 |
| % BPA, basis BPA + Resin | 11.1 | 51.7 | 97 | 100 |
| % CTBN, basis BPA + CTBN + Resin | 10% | 12% | 11% | 10% |

When these materials were tested as in Example I, it was observed that dry flexural strength improved at 19% Br addition level and dropped at higher levels and that wet strength dropped with BPA addition. Similarly, the energy when the samples were dry improved somewhat with 19 and 38% BPA addition but when the samples were wet the energy deteriorated with BPA addition.

EXAMPLE III

Two additional resin compositions (E and X) were prepared. They were identical to resin composition B of Example I except that the BPA was changed from the material having an EE of 545 (F2001P) to materials have EE values of 330 (F-2200, Composition E) and 1800 (F-2300, Composition X). Composition X was not in accord with the invention as it used a too high EE BPA. These compositions were formed into laminates and tested by the methods of Example I with the following results:

| Composition | A* | B* | E | X |
|---|---|---|---|---|
| Dry Flex Strength, MPa | 670 | 754 | 695 | 456 |
| Wet Flex Strength, MPa | 490 | 654 | 727 | 390 |
| Dry Energy, MPa | 28 | 35 | 33 | 15 |
| Wet Energy, MPa | 6 | 30 | 36 | 12 |

*Provided for comparison

This showed that the BPA's of EE below 1500 improved toughness but that the high EE BPA's degraded the epoxies' properties. All materials were tested for flame resistance. It was observed that all three BPA's were effective flame retardants.

EXAMPLE IV

Preparations similar to those of Examples II and III were prepared employing Ciba-Geigy "TGDDM" as epoxy resin in place of TEN Epoxy resin. When tested as in Example I these preparations showed that the brominated polymeric additives of EE less than 1500 toughen this polyfunctional resin alone or with CTBN and that the higher EE BPA degraded the epoxy's properties.

EXAMPLE V

The preparations of Example I are repeated employing in place of graphite cloth the following reinforcements and fabrication techniques.

| Preparation | Reinforcement | Fabrication Method |
|---|---|---|
| F | Aramid Yarn | Filament Winding |
| G | Glass Fiber Yarn | Filament Winding |
| H | Boron Nitride Cloth | Laminating |
| I | Carbon Cloth | Hand Lay Up |
| J | Silicon Carbide Tape | Filament Winding |

EXAMPLE VI

The preparations of Example II were repeated employing a preformed 50:50 weight copolymer of CTBN with TEN Epoxy as CTBN source with similar results as shown in Example II.

EXAMPLE VII

As a further demonstration of the improved properties achieved by practicing the present invention, a series of epoxy composites were prepared having a variety of BPA and CTBN additions. The composites were graphite laminates made from Hexel F3T-584-300-3K in accord with Example I. The materials used in the resin mixtures were as follows:
Resin-TEN resin
Curing agent-DDS
BPA-F-2001P
CTBN-HYCAR 1300X13 as a 1:1 weight copolymer with F-2001P or as a 1:1 weight copolymer with TGDDM resin
The following formulations were prepared:

| Formulation Number | CTBN, % | BPA, as % Bromine in Polymer |
|---|---|---|
| Y (Control) | 0 | 0 |
| K | 0 | 19 |
| L | 0 | 38 |
| Z (Control) | 5 | 0 |
| Z' (Control) | 10 | 0 |
| M | 10 | 4 |
| N | 10 | 19 |
| O | 10 | 38 |
| Y' (Control) | 15 | 0 |
| X' (Control) | 25 | 0 |

The composites were evaluated in instrumented impact tests. The testing was performed by two methods. The first method (A) was with the General Research (formerly Effects Technology) Dynatup Impact Tester (model 8200). In this procedure a 16 mm hemispherical head impacts a test specimen at a constant velocity. This instrumented impact technique provides a complete record of the impact event. Automated data analysis provides a record of the applied load and energy absorbed during impact.

The second method (B) was the Rheometrics impact tester. This method uses a microprocessor for data collection, calculation and display of the impact data.

The test specimens in all cases were 10.2×10.2 cm. Thickness varied from 23 mm to 28 mm. The impact tests were run at room temperature.

In both cases the test specimen is supported by a metal frame. In method A the specimen is mounted horizontally and in method B the specimen is mounted vertically. The use of both methods for testing the impact resistance of composites is well documented in the literature. F. Harper-Trevet, "Impact Testing of Toughened Epoxy Rein Systems," 27th National SAMPE Symposium, May 4–6, 1982, San Diego, Calif.; Sykes, G. F. and Stoakley, C. M., "Impact Penetraton Studies of Graphite/Epoxy Laminates", 12th National SAMPE Technical Conference, Oct. 7–9, 1980; Miller, A. G., Hertzberg, P. E., Rantala, V. W., "Toughness Testing of Composite Materials", 12th National SAMPE Technical Conference, Oct. 7–9, 1980.

Two values were determined for each test method. First is the maximum force (expressed in newtons) necessary for penetration of the test specimen. This is the value when delamination and fiber breaking of the composite specimen occurs. The second value is the total energy absorbed during the impact event (expressed in joules/cm thickness). The impact velocity of method A was 147 mm/sec and method B was 102 mm/sec.

The data from the instrumented impact tests are given in FIGS. 4–7 and Table III. The maximum force and energy absorbed test results were higher for method B than for method A. However, the relative rankings of the samples by the two methods were, in general, in close agreement.

In order to determine the effect of impact velocity on the test specimens, one sample (TEN resin with 10% rubber) was tested with method B at different impact velocities. The impact velocities were 102 mm/sec, 203 mm/sec, and 254 mm/sec. The maximum force for the samples were 3721, 3425, and 3425 newtons. The total energy absorbed for each of the samples was 67 joules/cm. Therefore, within the range of velocities tested, there was no significant variation in test results. This agrees with prior work by Sykes and Stoakley (noted above) in which samples were impacted at velocities in the range of 400 to 1300 mm/sec and it was found that the penetration energy was insensitive to impact velocity.

The BPA-containing samples gave excellent values without the addition of rubber. The 19% bromine (zero rubber) sample gave close to the best values in both test methods and each of the criteria (maximum load and energy absorbed).

Figure 6:
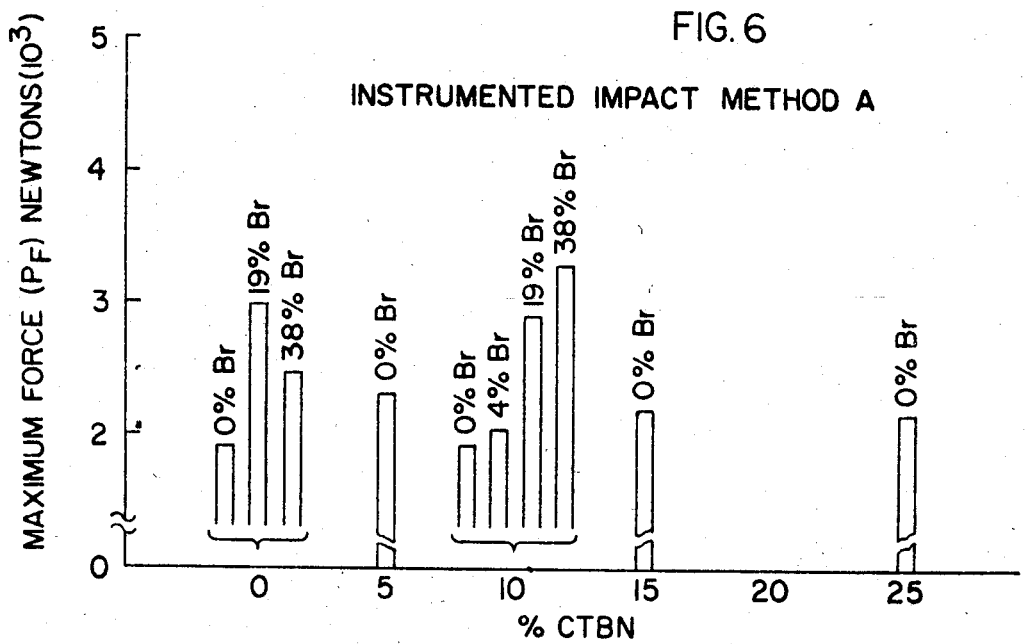
Figure 7:
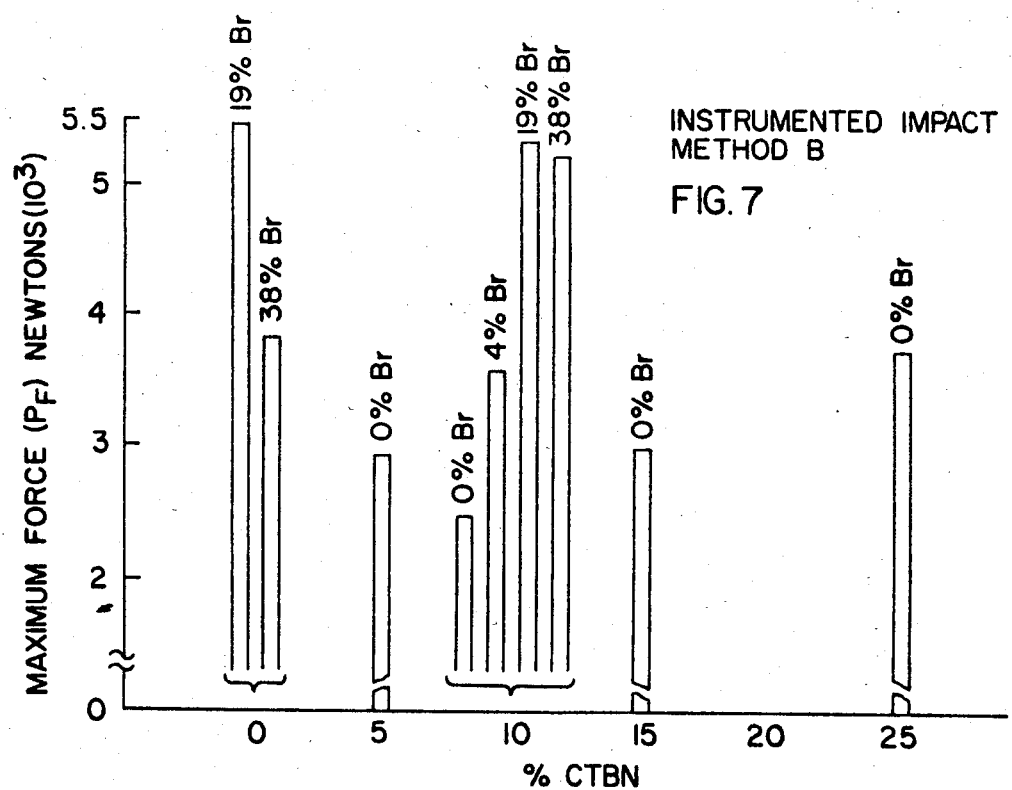

FIGS. 4 and 5 present the energy absorption data in bar graph form. In both methods little change is observed until the CTBN level reaches 25% when BPA is not present. The best values are seen with the BPA-containing system. The three levels of bromine (4%, 19%, 38%) and 10% CTBN show the effect of bromine on the impact resistance of the composites. The best values were obtained with the 38% bromine and 10% CTBN modified composite. FIGS. 6 and 7 present the data on maximum force of the various samples and demonstrate that BPA addition greatly improves impact strength. Table III presents these results in tabular form.

TABLE III

| | Instrumented Impact | | | |
| | Maximum Force (P$_F$)* Newtons | | Total Energy Absorbed* Joules/cm | |
| Sample | Method A | Method B | Method A | Method B |
|---|---|---|---|---|
| TEN CONTROL | 1922 | — | 52.6 | — |
| TEN + 5% CTBN | 2326 | 2926 | 59.1 | 55.7 |
| TEN + 10% CTBN | 2023 | 2491 | 48.1 | 56.4 |
| TEN + 15% CTBN | 2194 | 2996 | 52.9 | 57.1 |
| TEN + 25% CTBN | 2153 | 3721 | 60.1 | 67.0 |
| TEN + 19% Br | 2989 | 5446 | 68.9 | 89.3 |
| TEN + 38% Br | 2475 | 3811 | 65.9 | 73.2 |
| TEN + 4% Br + 10% CTBN | 2027 | 3557 | 51.0 | 58.8 |
| TEN + 19% Br + 10% CTBN | 2904 | 5332 | 72.0 | 82.2 |
| TEN + 38% Br + 10% CTBN | 3297 | 5211 | 83.6 | 106.8 |

*Values normalized to 62% vol. fibers
Method A = 0.15 meter/sec - General Research
Method B = 0.10 meter/sec - Rheometrics

We claim:

1. An epoxy resin composition comprising a polyfunctional epoxy resin selected from the group consisting of TEN epoxy resin of formula:

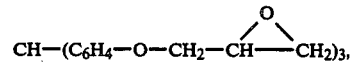

TGDDM epoxy resin of formula:

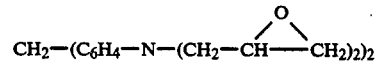

and mixtures thereof admixed with a toughening amount of a brominated diglycidyl additive having an epoxy equivalence of from about 250 to about 1500 and a bromine content of about 50% by weight, said epoxy resin composition additionally comprising a pre-formed copolymer of said brominated digycidyl additive with carboxy-terminated butadiene acrylonitrile rubber.

2. The epoxy resin composition of claim 1 wherein said epoxy resin composition additionally comprises carboxy-terminated butadiene-nitrile rubber.

3. A cured epoxy resin composite comprising the cured product of the admixture comprising 10 parts of a polyfunctional epoxy resin selected from the group consisting of TEN resin of formula:

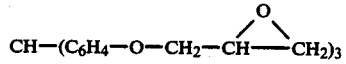

and TGDDM resin of formula

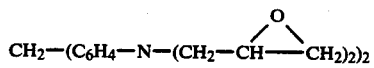

and mixtures thereof, from 6 to 12 parts of brominated diglycidyl additive selected from diglycidyl tetrabromo bisphenol A and diglycidyl poly(tetrabromo bisphenol A) having an epoxy equivalency value of from about 250 to about 1000 and from 0.65 to 1.2 equivalents, basis epoxy, of an amine-containing epoxy curing agent, said admixture additionally comprising carboxy-terminated butadiene-nitrile rubber.

4. The cured epoxy resin composite of claim 3 additionally comprising reinforcement.

5. The cured epoxy resin composite of claim 4 wherein said reinforcement is selected from glass fiber, graphite fiber, aramid fiber, boron nitride fiber and silicon carbide fiber.

6. The cured epoxy resin composite of claim 5 wherein said reinforcement is in the form of a laminate.

7. The cured epoxy resin composite of claim 6 wherein said reinforcement is graphite fiber.

* * * * *